Aug. 13, 1968   F. E. BADIN ET AL   3,396,584
SPACE SIMULATION AND RADIATIVE PROPERTY
TESTING SYSTEM AND METHOD
Filed Feb. 26, 1965   2 Sheets-Sheet 1

INVENTORS
FRANK EDWARD BADIN
FRANKLIN DENNIS FARNSWORTH
BY
*Darby & Darby*
ATTORNEYS Aug. 13, 1968     F. E. BADIN ET AL     3,396,584
SPACE SIMULATION AND RADIATIVE PROPERTY
TESTING SYSTEM AND METHOD
Filed Feb. 26, 1965     2 Sheets-Sheet 2
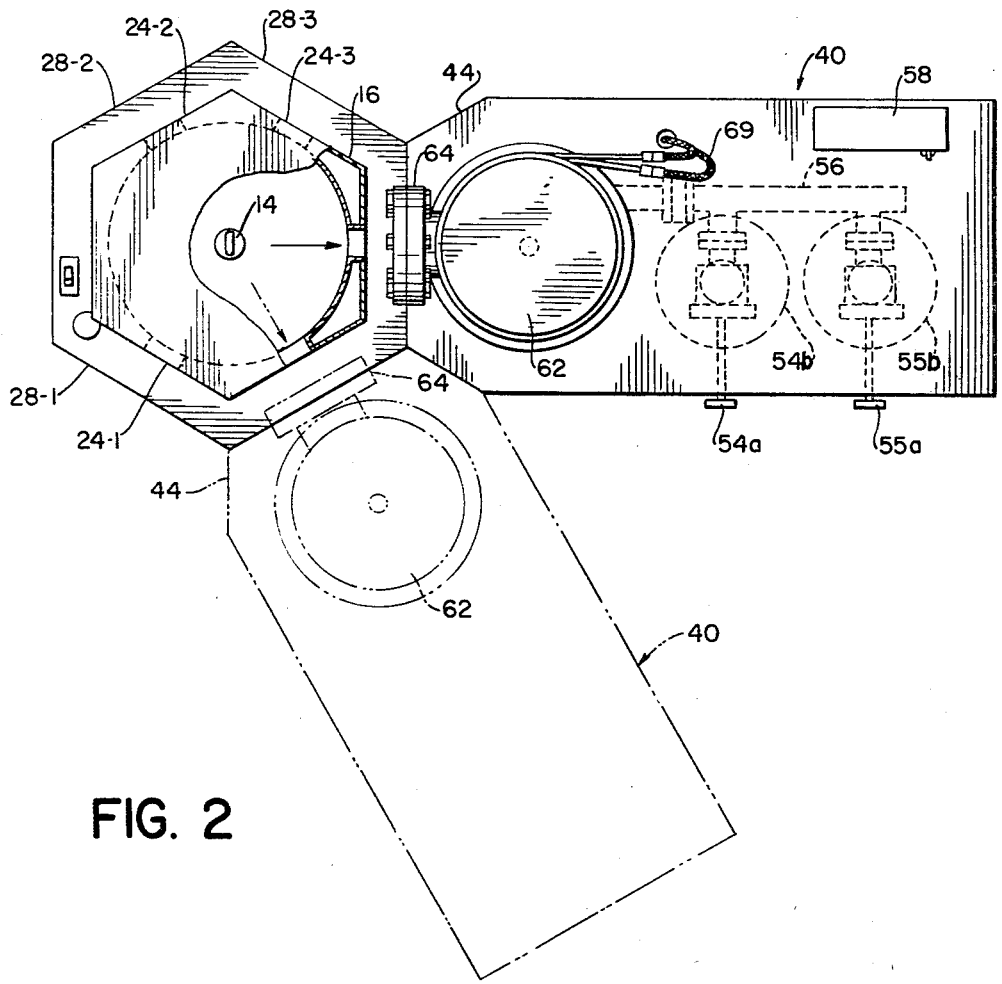
FIG. 2
FIG. 3
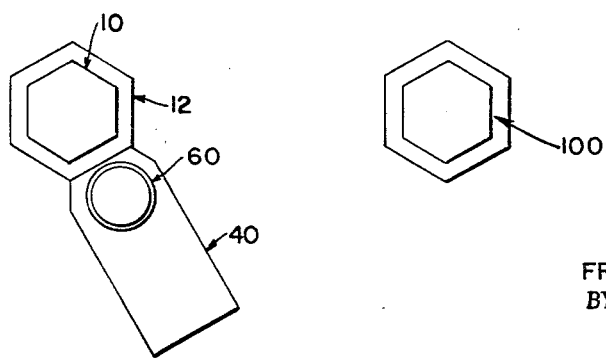
INVENTORS
FRANK EDWARD BADIN
FRANKLIN DENNIS FARNSWORTH
BY
*Darby & Darby*
ATTORNEYS

United States Patent Office 3,396,584
Patented Aug. 13, 1968

3,396,584
SPACE SIMULATION AND RADIATIVE PROPERTY TESTING SYSTEM AND METHOD
Frank Edward Badin and Franklin Dennis Farnsworth, Frederick, Md., granted to National Aeronautics & Space Administration under provisions of 42 U.S.C. 2457(d)
Filed Feb. 26, 1965, Ser. No. 435,433
4 Claims. (Cl. 73—432)

ABSTRACT OF THE DISCLOSURE

Method and apparatus for testing the heat radiative properties of material under controlled environmental conditions in which the temperature of the specimen is measured in response to irradiation by energy of a first type, the specimen is then irradiated by energy of a second type and then again irradiated by energy of said first type and the temperature measured in response thereto, all while being maintained in said controlled environment and without handling or being exposed to the atmosphere.

---

This invention relates to systems for testing properties of materials and more particularly to a system for testing the heat radiative properties of materials in response to radiation by calorimetric techniques under a controllable low pressure condition including that approaching a vacuum, and changes caused in these properties after the materials have been exposed to various other space environmental stimuli.

Many applications arise where it is desirable to test material specimens, such as materials having various coatings, under conditions approximating an outer-space environment to determine various characteristics of the material in this environment. Such outer-space environment is characterized by extremely low pressure, approaching a vacuum, and by a quantity of solar radiation and other forms of energy. One test performed under such conditions is to determine the heat radiative properties of the material specimen, that is, the properties of hemispherical emittance ($\epsilon$) and solar absorptance ($\alpha$) and the ratio of these two quantities, in response to irradiating energy such as solar radiation. Determination of the heat radiative properties is desirable since control of the temperature at which the material will remain in a space environment and the feasibility of using the material in the space environment is dependent thereon.

It is also desirable to be able to test the change in the heat radiative properties after the material has been exposed to another space environment stimuli, for example high intensity ultraviolet radiation X-rays, high vacuum, electron radiation, any one or all of which may degredate or alter these properties.

Prior art methods, such as the one discussed for testing material specimens under a space-like environment have been found to be relatively unsatisfactory for a number of reasons. First of all, the heat radiative properties of the specimen were not tested while the specimen received the two external stimuli of radiation and low pressure simultaneously thereby making it impossible to determine how the material would react under conditions it would actually encounter during use. Additionally, in the aforesaid prior art method, when a radiative property test is made after the specimen is exposed to solar radiation and before or after exposure to one or more forms of space environment stimuli the specimen is exposed to the atmosphere and is therefore subject to contamination by atmospheric gases which may alter or render invalid the results of the test. As another disadvantage, the specimen is subjected to contamination from handling as it is moved from one test to another and/or during tests.

The present invention is directed to a test system and method designed to eliminate all of the aforesaid disadvantages of the prior heat radiative property and degradation testing methods and systems. Accordingly, the present invention is directed to a method and system for testing the heat radiative properties of materials and other properties thereof and the effects of space environment on these materials and properties, while the material is simultaneously maintained in a controllable low pressure environment.

In accordance with the invention, an energy source is provided for generating energy of a particular type, frequency (or wavelength) or selected band of frequencies. This energy is directed toward a housing containing the specimen to be tested. The housing is in communication with apparatus for producing a controllable low pressure environment therein which can approach a vacuum.

The energy source is selected to produce energy at one particular frequency or of one particular type or over a range of frequencies. A number of ports are provided in the energy source enclosure to form a corresponding number of test stations and the energy from these ports passes into the specimen housing to irradiate the specimen. A low pressure environment is produced in the housing by vacuum apparatus and, where a heat radiative property test is to be performed, a thermocouple is connected to the specimen to measure the temperature of the specimen as it is simultaneously exposed to the energy at the desired low pressure.

In a preferred embodiment of the invention the specimen housing and the apparatus for producing the vacuum are mounted on a common base structure which is preferably made portable, such as by using a cart, to hold the various apparatus so the specimen housing can be placed adjacent a selected one of the ports of an energy source at a distance therefrom suitable for providing the desired intensity of energy for irradiating the specimen. The portable vacuum apparatus and specimen housing also enable the specimen to be placed successively adjacent a number of ports of one energy source or the ports of sources of several different types of energy. The intensity of the irradiating energy may also be controlled by spacing the specimen at different distances from the same or different ports of an energy source. The energy source and the portable carts are also designed so that a number of carts may be placed adjacent a source at the same time, thereby facilitating the testing of a number of specimens simultaneously.

Since the pressure environment of the specimen is controllable, the system has the capability of testing specimens under a variety of different irradiating energy and/or pressure conditions without exposing the specimen to external contamination such as by atmospheric gases, or subjecting it to handling between tests which also produces contamination. For example, the heat radiative properties of a specimen may be determined as the specimen located in the vacuum housing is irradiated by one type of energy. The specimen can then be exposed to and degraded by another type of energy and then the heat radiative properties can be redetermined in response to the first type of energy. All of this can be accomplished without exposing the specimen to any contaminating gases or handling and while still maintaining the specimen in the low pressure environment at all times.

The plurality of test stations of the energy source also may be provided with jigs for spacing the carts from the source to reduce the probability of error in making measurements. These jigs are so mounted to insure that specimens located in different housings will receive a predetermined radiation intensity.

It is therefore an object of the present invention to provide a method and system for testing the heat radiative properties of material specimens under simulated space conditions.

Another object is to provide a system for testing the heat radiative properties of a material specimen while the specimen is located in a controllable low-pressure environment which can simulate the outer-space condition of a near-vacuum.

A further object is to provide a method and system for determining the heat radiative properties of a specimen, degrading the specimen by exposing it to a selected type of energy and then redetermining the heat radiative properties while keeping the specimen in a controlled low pressure and uncontaminated environment at all times.

A further object is to provide a system using an energy source in which the source has a number of test stations and locating the specimen in a portable low pressure housing which may be placed adjacent to any one of the test stations.

Another object is to provide a radiative property testing system in which a simulated solar source is used to produce radiation from a number of ports and the specimen to be tested is located in a portable low pressure housing capable of being placed adjacent the various ports of the source.

Other objects and advantages of the present invention will become more apparent upon consideration of the following specification and annexed drawings in which:

FIGURE 2 is a top plan view of the apparatus of FIGURE 1, also shown partially broken away; and FIGURE 3 is a diagrammatic view showing the use of one cart and specimen housing with a plurality of energy sources.

Figure 1:
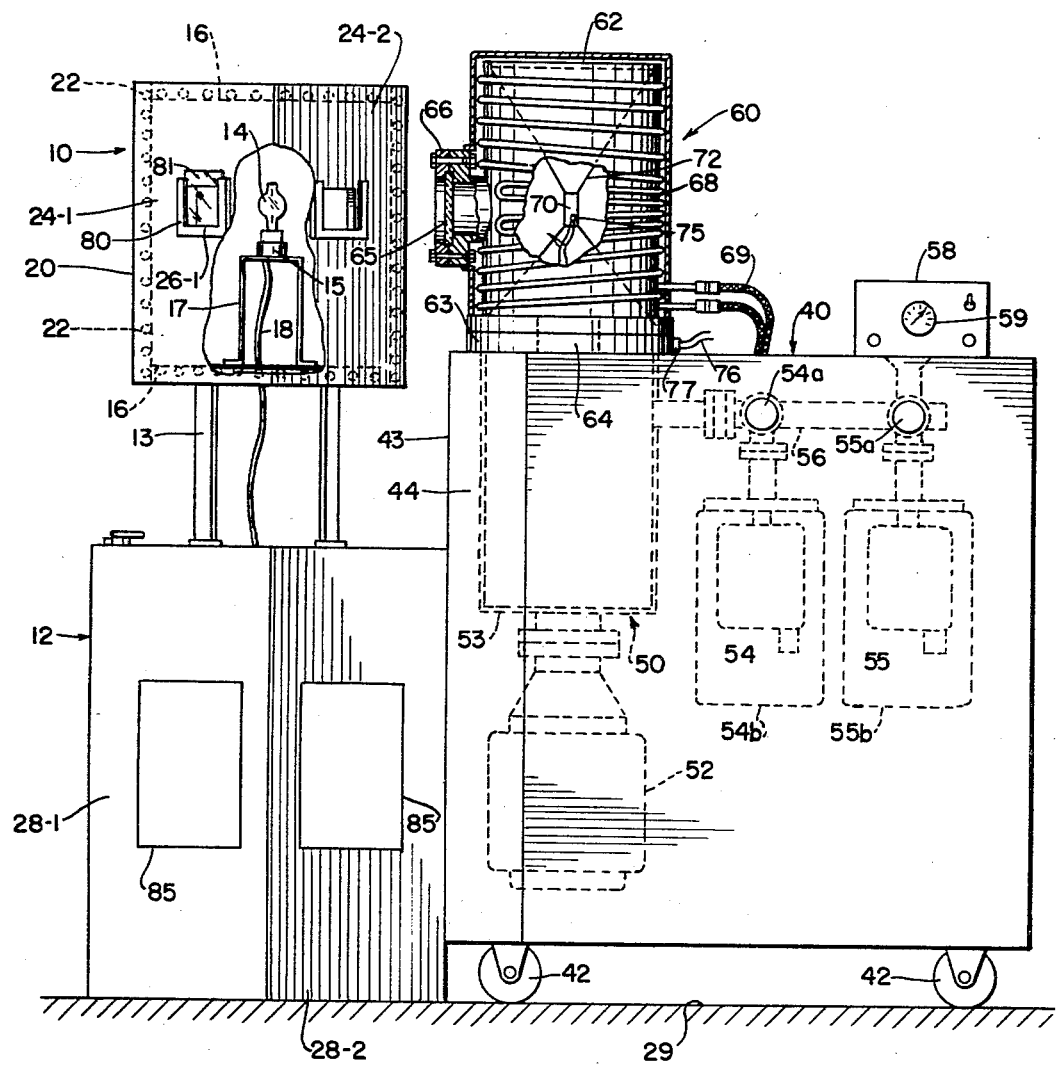
FIGURE 1 is a side elevational view, taken partially in section, of the testing system showing the energy source and the portable cart holding the specimen housing and vacuum producing apparatus.

Referring to FIGURES 1 and 2, an enclosure 10 for an energy source of the testing system is mounted on a base support 12 by a plurality of struts 13. A so-called simulated solar source configuration is shown which includes a lamp 14 mounted on a base 15 both of which are located within a surrounding structure 16. The base 15 is in turn mounted on the bottom wall of structure 16 by a plurality of struts 17 and any suitable fastening means (not shown).

In the embodiment being described, the source illustratively is to produce energy having a spectrum approximating that of the sun. Therefore, lamp 14 is preferably of the well-known mercury-xenon arc discharge type. This type of lamp is used since it emits radiation over a range of wavelengths which most closely matches the radiation encountered under extra-terrestrial conditions. The lamp output contains radiation in the ultraviolet range, such as is produced by the sun, this radiation usually being the most deleterious to materials in space. Any suitable mercury-xenon lamp may be utilized and the output capacity thereof selected to produce a desired intensity output radiation. Any other type of simulated solar source may be used, for example, a carbon arc. The leads 18 from the lamp 14 to the power supply (not shown) are brought in through the bottom of the enclosure 10 from the base 12 or directly from the power supply. Any conventional type of power supply may be utilized in accordance with the requirements of the lamp.

The structure 16 is illustratively generally cylindrical in shape and is preferably made of a metal capable of withstanding high temperatures encountered. The inner wall of structure 16 is painted black or made of a black metal. If desired, the inner wall of structure 16 can be made reflective and/or optical components can be placed therein to collimate and otherwise control the light output of the lamp.

Structure 16 is completely surrounded by an outer wall 20 spaced therefrom. A core 22 of cooling coils is located in the space between structure 16 and the outer wall 20.

The core 22 may be connected to any suitable type of liquid or gaseous cooling source (not shown). Various types of cooling sources may be used, for example, water liquid nitrogen, etc. Many such sources are well-known in the art and they therefore need no further description.

The outer wall 20 of the energy source enclosure 10 preferably has a number of flat sides 24 formed as a regular polygon. Six sides 24–1 through 24–6 are illustratively shown so the wall 20 is therefore a hexagon. Of course, as many sides may be provided for the wall 20 as is needed. A port 26 is provided in each side wall 24 and each port also extends through the structure 16 so that the radiant energy from lamp 14 may pass outwardly from enclosure 10 through the ports 26. Each port 26 is preferably located midway of the width of each side wall 24 and, for example, may be about two inches square. Of course, any suitable size and shape of hole may be used. The coils of the cooling core 22 are located to clear the ports.

The base 12 on which the enclosure 10 is mounted has a number of flat sides 28 corresponding to the sides 24 of enclosure 10 and are parallel thereto. This can be seen more clearly in FIGURE 2. Base 12 can be fixedly mounted to a floor 29 or else made portable, with or without a suitable brake. Each port 26 of the enclosure and the corresponding sides 24 of the enclosure and 28 of the base form a test station.

A portable cart 40 holds both the apparatus 50 for producing the vacuum and the specimen housing 60. A number of wheels 42 make the cart portable and the front thereof has a flat portion 43 of the same width as a side 28 of base 12. Angled sides 44 are also provided on the cart so that two or more carts may be placed adjacent each other opposite two test stations with their corresponding front faces 43 abutting the walls 28, as shown in FIGURE 2, or with the front faces spaced from the walls.

Specimen housing 60 includes a cover 62 of conventional construction, for example, a so-called bell-jar. This cover is mounted on a base plate 63 by suitable readily removable fastening means (not shown) and the base is in communication with the vacuum producing apparatus 50 through an opening 64 in the base plate 63 and the bottom of cover 62. The vacuum producing apparatus may be of any suitable type capable of producing as near perfect vacuum condition as possible. For example, either a diffusion type vacuum pump or an ion type pump may be used. FIGURES 1 and 2 diagrammatically show an ion pump 52 which is of any suitable commercially available type, and a connecting sump 53 which is in communication with the bell jar 62 through opening 64. An ion pump is preferably used since it is capable of producing very low pressures, in the neighborhood of $10^{-12}$ torr and it is also clean and needs no oil for operation as do other types of pumps.

Two refrigerated sorption pumps 54 and 55 are also provided which are in communication with sump 53 through respective valves 54a and 55a and a pipe 56. The sorption pumps provide a means for reducing vacuum pressure in sump 53 and cover 62 without contamination. The sorption pumps function in a conventional manner, for example, by absorbing gas molecules on a liquid-nitrogen chilled molecular sieve. The latter may be, for example, metal alumina silicate with a porous crystal structure capable of adsorbing large quantities of gas and vapors. The liquid nitrogen source is preferably self-contained on cart 40 and is shown by the two containers 54b and 55b surrounding the pumps 54 and 55. If desired an external liquid nitrogen source can be used. The usual controls for the ion pump, are shown diagrammatically within a control housing 58. These include a gauge 59 for indicating the pressure produced by the pump.

The specimen of material 70 to be tested is suspended within the cover 62 by a plurality of threads 72 connected thereto. Threads 72 may be of nylon, or of any other suitable material, preferably one with a low thermal conductivity. Specimen 70 is suspended at a known point within the cover, for example, at the center thereof, aligned with an inlet port 66 on the cover. The inlet port 66 has a plate 65 suitably mounted therein to seal off the bell jar while still permitting radiation from the lamp 14 to impinge upon the specimen. Where the incoming energy contains radiation is in the ultraviolet range, plate 65 may be of quartz since this material is relatively transparent to radiation in the ultraviolet range. Other suitable plates are used for different types of energy, for example, a grating for X-rays. Inlet port 66 is located at a height such as to place it directly opposite a port 26 of enclosure 10 when a cart 40 is rolled into an operative test position adjacent base 12.

A thermocouple 75 is attached to the specimen 70 to measure its temperature. The leads 76 for the thermocouple are brought out through the base plate 63 by a suitable plug 77 therein which is capable of maintaining the vacuum within the bell jar. Thermocouple leads 76 are to be connected to a suitable instrument (not shown) which indicates the temperature of the specimen 70 measured.

A flexible tube 68 for carrying a suitable cooling fluid, such as liquid nitrogen, is located inside cover plate 62. This cools the bell jar which is heated by the incoming energy from lamp 14. If desired, the cooling tube 68 can be placed outside the bell jar and a shroud placed thereover. Connection is made between the cooling tube and a source of cooling fluid, such as liquid nitrogen, by the conduits 69 and their corresponding connectors.

The system is operated by mounting the specimen 70 to be tested within the housing 60 and adjusting the vacuum apparatus to produce the desired pressure within the bell jar. The lamp 14 is turned on and a cart is spaced from base 12 the proper distance to obtain the desired intensity radiation on the specimen. Alternatively, the output of the lamp may be regulated to produce the desired intensity radiation with the front 43 of the cart 40 moved into abutment with a wall 28 of base 12. The latter places the specimen 70 at a fixed distance from lamp 14.

To determine the intensity of radiation impinging upon a specimen, a pyroheliometer (not shown) is mounted on a cart 40 together with a calibrated optical bench. The intensity of radiation at any given distance from lamp 14 is precisely measured by these two instruments. A spectrophotometer or other suitable instrument also may be used to determine the wavelength of radiation emitted by lamp 14. A cart 40 holding a specimen is then moved into the position previously occupied by the pyroheliometer at a distance from lamp 14 at which the desired intensity of radiation occurs. Since the distance from the front 43 of a cart 40 to the specimen 70 in housing 62 is fixed and known, as is the horizontal distance from lamp 14 to a wall 28 of base 12, this can be readily accomplished. If the desired distances are not obtained when the front 43 of cart 40 abuts a wall 28, then the cart can be moved back. In this case a calibrated (distance) pull-out jig 85 is provided in the base 12 for each wall 28. These jigs can be used to accurately set the distance from the specimen to the lamp.

A frame 80 is placed adjacent each port 26 to hold an optical filter 81 which is illustratively shown only in front of port 26–1. The filter is selected to produce output radiation from a port at a desired wavelength or wavelengths. As indicated previously, any suitable type of lamp 14 or other source of radiation may be used to produce a particular one or band of output wavelengths.

As should be clear the system of FIGS. 1 and 2 can measure the heat radiative properties of a specimen 70 at any desired simulated solar radiation intensity, or wavelength thereof, and/or any desired pressure. From the incoming radiation as originally measured by the pyroheliometer, the temperature measured by thermocouple 75, and other predetermined variables, such as the size of the specimen, heat capacity of the specimen, thermal conductivity of the thermocouple leads, etc., the hemispherical emittance ($\epsilon$) and the solar absorptance ($\alpha$) may be calculated. Also, a number of specimens can be tested at the same time since a plurality of carts 40 can be placed around the source enclosure, as shown in FIGURE 2.

The system of the present invention also may be used to test the heat radiative properties of the specimen to simulated solar radiation and other forms of radiation both before and after the specimen has been exposed to, and perhaps degraded by, one or more other types of space environment stimuli, such as a vacuum, or energy, such as ultraviolet radiation, electrons, X-rays, neutrons, protons, heat, etc., which the material may encounter in a space environment. To do this, as shown in FIGURE 3, another energy source 100, or plurality of such other energy sources are utilized. These other sources 100 may be, for example; a mercury lamp for producing high intensity ultraviolet radiation, a Van de Graff generator or electron beam or beam gun for producing electrons, an X-ray source, neutron and proton generators, a heat source, etc. These different types of sources or the energy emitting portions are also preferably mounted in a base and enclosure arrangement 10 and 12 similar to that shown in FIGS. 1 and 2 so that a plurality of specimens may receive the energy at the same time. Where this is impractical, the source 100 is mounted in the best possible manner.

In the degradation type of test, the heat radiative properties of the specimen are determined in the manner described with respect to FIGS. 1 and 2, this usually being in response to the simulated solar radiation. The portable cart 40 holding the specimen, is then removed from the simulated solar source and placed in operative relationship with the other source 100 for producing a second form energy of a different type. The specimen is irradiated by this second form of energy of a predetermined intensity and for a predetermined time, which second form of energy may degrade the specimen. After this is done, the cart is again placed adjacent the simulated solar source and the heat radiative properties of the specimen are again determined in the manner previously described. Thus, the effect of the second form of energy on the heat radiative properties of the specimen can be determined. It should be clear that the specimen is at all times maintained in the low pressure environment and exposed to both forms of energy in this environment. Therefore, the specimen is exposed to the different forms of energy and tested in situ at all times and there is no possibility of contamination by atmosphere gases or by handling which might affect the validity of a test.

It should also be understood that the same specimen may be exposed to two or more forms of energy at the same time or successively for various periods of time and then the heat radiative properties re-tested in response to the simulated solar radiation after one or more exposures to the different forms of energies.

It should also be understood that the specimen can be exposed to other space stimuli, for example, a vacuum. In the present invention the heat radiative properties of a specimen can be tested when the specimen is first placed in the vacuum housing, then left for a predetermined period therein with or without being irradiated by a form of energy and then re-tested. Of course, the specimen can be exposed to one or more forms of energy for various lengths of time during its stay in the vacuum environment.

While the foregoing description has been specifically directed to the testing of the heat radiative properties of material specimens by calorimetric techniques, it should be understood that other tests of other material properties may be made simultaneously or separately while the specimen is in the low pressure environment and is exposed to one or more types of energy. For example, the weight and weight loss properties can be determined by placing the specimen on a balance within the vacuum housing, outgassing can be tested by a gas chromatograph or other suitable instrument, and other properties of the material which could be affected by the space environment and stimuli can be similarly tested.

While a preferred embodiment of the invention has been described above it will be understood that this embodiment is illustrative only and the invention is to be limited solely by the appended claims.

What is claimed is:

1. A system for testing the heat radiative properties of a material specimen comprising:

means housing said specimen in a controlled environment separate from the atmosphere, a source of energy of a first type for irradiating the specimen in the housing means in the controlled environment, means for measuring the temperature of said specimen in response to the irradiation by the first type of energy, a source of energy of a second type different from said first type, means for irradiating the specimen with said energy of said second type and then again with said energy of said first type while still maintaining the specimen in the controlled environment and without removing it from the housing means, and means for measuring the temperature of said specimen in response to the second irradiation by said energy of said first type.

2. The method of testing the heat radiative properties of a material specimen comprising the steps of:

placing said material in a controlled environment chamber, irradiating the specimen in the chamber with a quantity of a first type of energy, measuring the temperature of said specimen in response to said first type of energy, next irradiating the specimen in said chamber with a quantity of a second type of energy which is different from said first type without removing it from said controlled environment, then irradiating the specimen again in the controlled environment of the chamber with said first type of energy, and again measuring the temperature of the specimen in response to the first type of energy.

3. The method of testing the heat radiative properties of a material specimen comprising the steps of:

irradiating the specimen with a quantity of a first type of energy, simultaneously subjecting the specimen to a low pressure environment, measuring the temperature of the specimen in response to the irradiation by said first type of energy, irradiating the specimen with a quantity of energy of a second type while still subjecting the specimen to said low pressure environment and without removing it therefrom, irradiating the specimen again with a quantity of said first type of energy, and measuring the temperature of the specimen in response to the second irradiation of the specimen by said first type of energy.

4. The method of testing the heat radiative properties of a material specimen comprising the steps of:

irradiating the specimen with simulated solar radiation, simultaneously subjecting the specimen to a low pressure environment, measuring the temperature of the specimen in response to the simulated solar radiation, next irradiating the specimen with energy of a second type while still subjecting the specimen to said low pressure environment and without removing it therefrom, then irradiating the specimen again with the simulated solar radiation, and again measuring the temperature of the specimens in response to the simulated solar radiation.

References Cited

UNITED STATES PATENTS 3,069,893 12/1962 Kerstetter _____ 73—15
3,222,517 12/1965 Peter _____ 240—36XR

OTHER REFERENCES

Solar Radiation Simulators, Bulletin 310C Genarco, January 1963, page 7.

Space Environment Testing, Bulletin of Astrosystems Inc., page 3, October 1962.

S. CLEMENT SWISHER, *Acting Primary Examiner.*

NEIL B. SIEGEL, *Assistant Examiner.*